(12) United States Patent
Furutani et al.

(10) Patent No.: US 7,356,349 B2
(45) Date of Patent: Apr. 8, 2008

(54) HIGH-FREQUENCY MODULE AND COMMUNICATION APPARATUS

(75) Inventors: Koji Furutani, Moriyama (JP); Tetsuro Harada, Otsu (JP); Takako Sato, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 293 days.

(21) Appl. No.: 10/817,796

(22) Filed: Apr. 6, 2004

(65) Prior Publication Data

US 2004/0248539 A1 Dec. 9, 2004

(30) Foreign Application Priority Data

Jun. 5, 2003 (JP) ............... 2003-161218

(51) Int. Cl.
*H04M 1/00* (2006.01)
(52) U.S. Cl. ............... 455/552.1; 455/553.1; 455/78
(58) Field of Classification Search ............. 455/552.1, 455/553.1, 73, 76, 78, 83, 168.1, 277.1, 101
See application file for complete search history.

(56) References Cited

U.S. PATENT DOCUMENTS

| | | | |
|---|---|---|---|
| 6,459,885 B1 * | 10/2002 | Burgess | 455/83 |
| 6,606,015 B2 | 8/2003 | Uriu et al. | |
| 6,628,925 B1 * | 9/2003 | Ishida et al. | 455/73 |
| 6,867,662 B2 | 3/2005 | Uriu et al. | |
| 6,990,357 B2 * | 1/2006 | Ellä et al. | 455/553.1 |
| 7,003,312 B2 | 2/2006 | Kemmochi et al. | |
| 7,023,296 B2 | 4/2006 | Uriu et al. | |
| 7,076,216 B2 | 7/2006 | Hayashi | |
| 7,253,702 B2 | 8/2007 | Kemmochi et al. | |
| 2002/0032038 A1 * | 3/2002 | Furutani et al. | 455/552 |
| 2002/0090974 A1 | 7/2002 | Hagn | |
| 2003/0214367 A1 * | 11/2003 | Uriu et al. | 333/132 |
| 2004/0032706 A1 | 2/2004 | Kemmochi et al. | |
| 2004/0092285 A1 * | 5/2004 | Kodim | 455/552.1 |
| 2004/0208137 A1 * | 10/2004 | Martinez | 370/282 |
| 2005/0077980 A1 * | 4/2005 | Watanabe et al. | 333/126 |
| 2005/0085201 A1 * | 4/2005 | Martin et al. | 455/168.1 |

(Continued)

FOREIGN PATENT DOCUMENTS

DE 100 53 205 5/2002

(Continued)

OTHER PUBLICATIONS

Official Communication issued in the corresponding Korean Application No. 10-2004-0040834, mailed on Feb. 6, 2006.

(Continued)

*Primary Examiner*—Lana Le
(74) *Attorney, Agent, or Firm*—Keating & Bennett, LLP (57) ABSTRACT

A high-frequency module includes a switching circuit having a phase-shift circuit. The phase-shift circuit matches only PCS/DCS reception signals so as to be passed therethrough by setting a control-voltage input terminal to a Low level when receiving PCS/DCS signals, and attenuates PCS/DCS transmission signals to the PCS/DCS reception circuit side by setting the control-voltage input terminal to a Hi level when transmitting PCS/DCS signals. Also, another phase-shift circuit, which further attenuates the PCS transmission signal when transmitting the PCS signal, is provided in the DCS Rx terminal side of the phase-shift circuit.

18 Claims, 11 Drawing Sheets

U.S. PATENT DOCUMENTS

| | | |
|---|---|---|
| 2006/0030355 A1 | 2/2006 | Kemmochi et al. |
| 2006/0079275 A1* | 4/2006 | Ella et al. ............... 455/552.1 |
| 2006/0223368 A1 | 10/2006 | Hayashi |

FOREIGN PATENT DOCUMENTS

| | | | |
|---|---|---|---|
| DE | 100 54 968 | | 5/2002 |
| DE | 10054968 | * | 5/2002 |
| JP | 10-032521 | | 2/1998 |
| JP | 2001-160766 | | 6/2001 |
| JP | 2002-171198 A | | 6/2002 |
| JP | 2002-261651 A | | 9/2002 |
| JP | 2004-128799 A | | 4/2004 |
| JP | 2004-135316 A | | 4/2004 |
| KR | 2002-0010526 A1 | | 2/2002 |
| WO | 01/048935 A1 | | 7/2001 |
| WO | 2002/037709 A1 | | 5/2002 |

OTHER PUBLICATIONS

Official Communication dated Dec. 21, 2005, issued in the corresponding German Patent Application No. 10 2004 024911.3-35 (with full English translation).

Official communication issued in the counterpart Japanese Application No. 2003-161218, mailed on Jul. 3, 2007.

* cited by examiner

HIGH-FREQUENCY MODULE AND COMMUNICATION APPARATUS

BACKGROUND OF THE INVENTION

1. Field of the Invention

The present invention relates to a high-frequency module for separating three or more communication signals using different frequency bands so as to transmit/receive the signals, and to a communication apparatus including such a high-frequency module.

2. Description of the Related Art

Various radio communication schemes, such as CDMA and TDMA schemes, are currently being used in mobile phones or other communications devices. The TDMA scheme includes GSM (Global System for Mobile Communications) using a 900 MHz band, DCS (Digital Cellular System) using a 1800 MHz band, and PCS (Personal Communication System) using a 1900 MHz band. Among them, PCS is allocated with a frequency band of 1850 to 1910 MHz for a transmission signal and a frequency band of 1930 to 1990 MHz for a reception signal. Also, DCS is allocated with a frequency band of 1710 to 1785 MHz for a transmission signal and a frequency band of 1805 to 1880 MHz for a reception signal.

When radio waves (communication signals) of the three different communication schemes (GSM, DCS, and PCS) are transmitted/received by an antenna, signals other than a signal of a frequency band used in actual communication are unnecessary. For example, when communication is performed in the GMS scheme (900 MHz band), communication signals of the DCS scheme (1800 MHz band) and the PCS scheme (1900 MHz band) are unnecessary.

With the miniaturization of mobile phones, each element constituting a mobile phone has been required to be miniaturized. Therefore, a high-frequency module for individually transmitting/receiving signals of different communication schemes should be improved, and a high-frequency module for integrating different communication schemes is required.

Accordingly, a high-frequency module need be miniaturized by using a diplexer for receiving radio waves of different communication schemes by a single antenna and extracting only a communication signal of a necessary communication scheme (frequency band) and a switch and duplexer for separating transmission and reception signals of each communication scheme.

Figure 8:
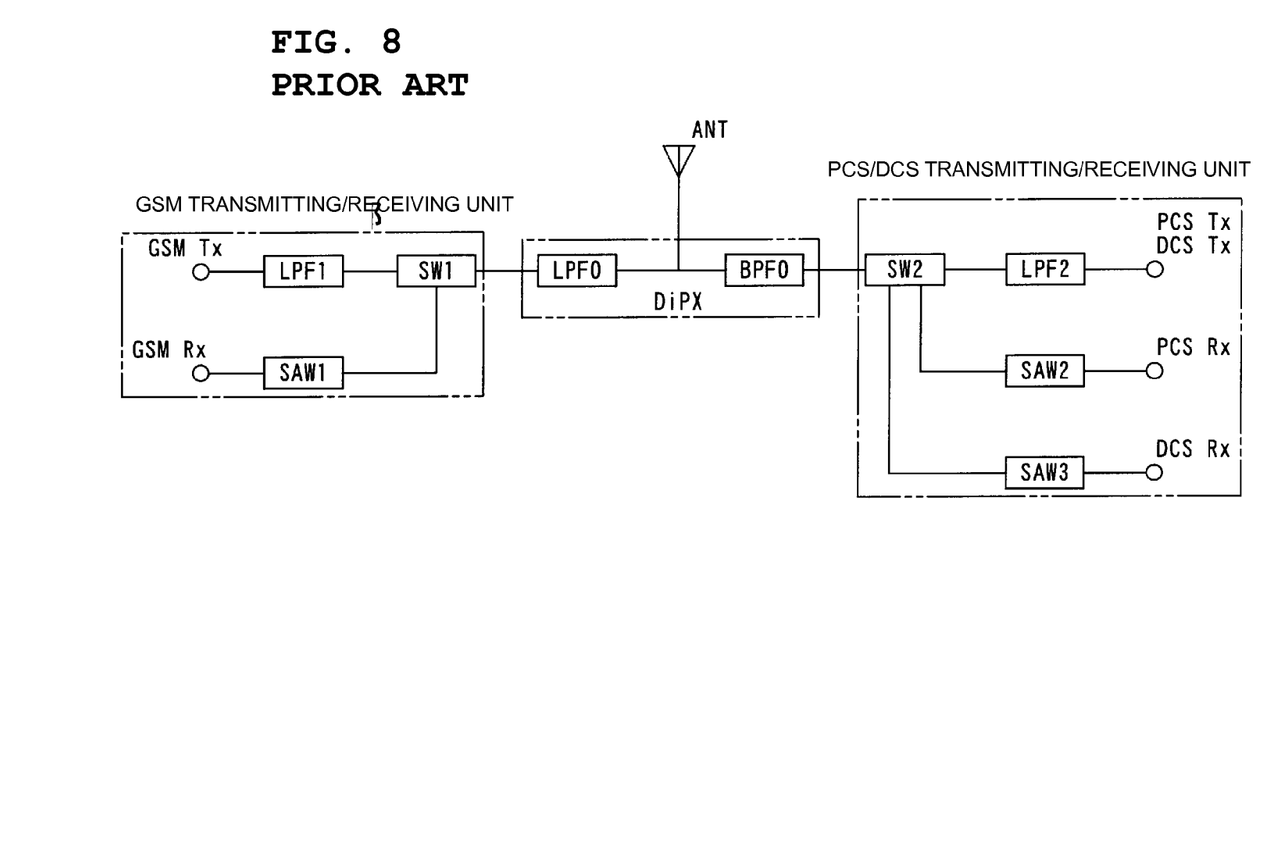
FIG. 8 is a block diagram showing a critical portion of a known high-frequency module.
Figure 9:
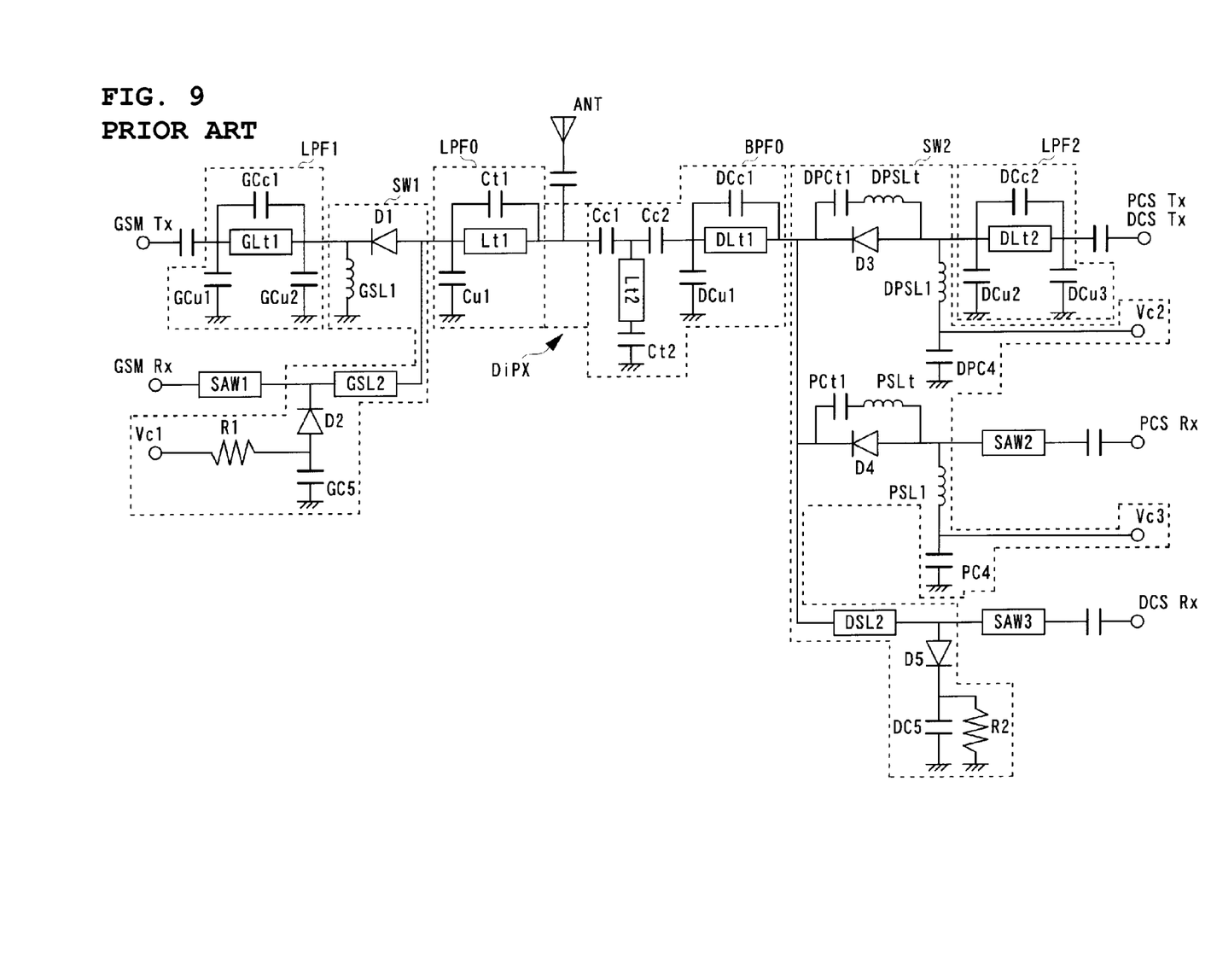
FIG. 9 is an equivalent circuit diagram of the high-frequency module shown in FIG. 8.

In order to transmit/receive communication signals of the three different frequency bands, a high-frequency module shown in FIGS. 8 and 9 has been proposed.

FIG. 8 is a block diagram showing a known high-frequency module for separately transmitting/receiving each of signals of GSM, DCS, and PCS; and FIG. 9 shows the equivalent circuit thereof.

As shown in FIG. 8, the known high-frequency module for transmitting/receiving signals of GSM, DCS, and PCS includes a GSM transmitting/receiving unit, a PCS/DCS transmitting/receiving unit, and a diplexer DiPX connected between the transmitting/receiving units and an antenna ANT. The GSM transmitting/receiving unit includes a GSM Tx terminal to which a GSM transmission signal is input, a GSM Rx terminal for outputting a GSM reception signal, a low-pass filter LPF1 for allowing the GSM transmission signal to pass therethrough, a SAW filter SAW1 for allowing the GSM reception signal to pass therethrough, and a switching circuit SAW1 for switching the GSM transmission/reception signals, between the SAW filter SAW1 and the diplexer DiPX.

The PCS/DCS transmitting/receiving unit includes a PCS/DCS Tx terminal to which PCS/DCS transmission signals are input, a PCS Rx terminal for outputting a PCS reception signal, a DCS Rx terminal for outputting a DCS reception signal, a low-pass filter LPF2 for allowing the PCS/DCS transmission signals to pass therethrough, a SAW filter SAW2 for allowing the PCS reception signal to pass therethrough, a SAW filter SAW3 for allowing the DCS reception signal to pass therethrough, and a switching circuit SAW2 for switching the PCS/DCS transmission signals, the DCS reception signal, and the PCS reception signal, between the SAW filter SAW3 and the diplexer DiPX.

The diplexer DiPX includes a low-pass filter LPF0 for allowing the GSM transmission/reception signals to pass therethrough and a band-pass filter BPF0 for allowing the PCS/DCS transmission/reception signals to pass therethrough. The antenna ANT is connected to a junction point between the low-pass filter LPF0 and the band-pass filter BPF0.

A more specific circuit structure is shown in FIG. 9. The switching circuit SW1 includes a diode D1, the cathode thereof being connected to the low-pass filter LPF1 and the anode thereof being connected to the low-pass filter LPF0 of the diplexer DiPX, an inductance element GSL1 connected between the cathode of the diode D1 and the ground, a transmission line GSL2 connected between the anode of the diode D1 and the SAW filter SAW1, a diode D2, the cathode thereof being connected to a junction point between the transmission line GSL2 and the SAW filter SAW1, a control-voltage input terminal Vc1 connected to the anode of the diode D2 through a resistor R1, and a capacitance element GC5 connected between the anode of the diode D2 and the ground.

The switching circuit SW2 includes a diode D3, the anode thereof being connected to the low-pass filter LPF2 and the cathode thereof being connected to the band-pass filter BPF0 of the diplexer DiPX, a series circuit including an inductance element DPSLt and a capacitance element DPCt1 connected in parallel with the diode D3, a control-voltage input terminal Vc2 connected to the anode of the diode D3 through an inductance element DPSL1, and a capacitance element DPC4 connected between a junction point of the inductance element DPSL1 and the control-voltage input terminal Vc2 and the ground. Also, the switching circuit SW2 includes a transmission line DSL2 connected between the cathode of the diode D3 and the SAW filter SAW3, a diode D5, the anode thereof being connected to a junction point of the transmission line DSL2 and the SAW filter SAW3, and a parallel circuit including a resistor R2 and a capacitance element DC5 connected between the cathode of the diode 5 and the ground. Further, the switching circuit SW2 includes a diode D4, the anode thereof being connected to the SAW filter SAW2 and the cathode thereof being connected to the band-pass filter BPF0 of the diplexer DiPX, a series circuit including an inductance element PSLt and a capacitance element PCt1 connected in parallel to the diode D4, a control-voltage input terminal Vc3 connected to the anode of the diode D4 through an inductance element PSL1, and a capacitance element PC4 connected between a junction point of the inductance element PSL1 and the control-voltage input terminal Vc3 and the ground.

In this high-frequency module, transmission/reception of communication signals of GSM/PCS/DCS is controlled by a voltage input to the control-voltage input terminal of each switching circuit, as shown in Table 1. Table 1 shows the relationship between the state of voltage input to each control-voltage input terminal and the transmission/reception state of GSM/PCS/DCS.

TABLE 1

| Vc1 | | Vc2/Vc3 | |
|---|---|---|---|
| Hi | GSM Tx | Hi/Low | PCS,DCS Tx |
| | | Low/Hi | PCS Rx |
| Low | GSM Rx | | |
| | | Low/Low | DCS Rx |

As shown in FIG. 9 and Table 1, when the control-voltage input terminal Vc1 is in a Hi level, the diodes D1 and D2 are ON, and the transmission line GSL2 functions as a phase-shift circuit for shifting phase so that the GSM reception side viewed from a junction point between the transmission line GSL2 and the anode of the diode D1 is open to the frequency of the GSM transmission signal. Accordingly, the GSM transmission signal is not transmitted to the GSM reception side through the diode D1, but is transmitted to the diplexer DiPX. On the other hand, when the control-voltage input terminal Vc1 is in a Low level, the diodes D1 and D2 are OFF and are opened. Therefore, the GSM reception signal from the diplexer DiPX is not transmitted to the GSM transmission side but is transmitted to the GSM reception side through the transmission line GSL2.

When the control-voltage input terminal Vc2 is in a Hi level and when the control-voltage input terminal Vc3 is in a Low level, the diodes D3 and D5 are ON and the diode D4 is OFF. At this time, the transmission line DSL2 functions as a phase-shift circuit for shifting phase so that the DCS reception side viewed from a junction point between the transmission line DSL2 and the cathode of the diode D3 is open to the frequencies of the PCS/DCS transmission signals. Also, the diode D4 is opened and the PCS reception side is open to the frequencies of the PCS/DCS transmission signals. More precisely, since the diode D4 functions as a capacitance element having a small capacitance in its OFF state, parallel resonance of the capacitance of the diode D4 and the inductance element PSLt increases the impedance to the frequencies of the PCS/DCS transmission signals, so that the PCS reception side is opened. Accordingly, the PCS/DCS transmission signals are not transmitted to the PCS/DCS reception sides, but are transmitted to the diplexer DiPX.

On the other hand, when the control-voltage input terminal Vc2 is in a Low level and the control-voltage input terminal Vc3 is in a Hi level, the diode D3 is OFF and the diodes D4 and D5 are ON. Therefore, the transmission line DSL2 functions as a phase-shift circuit for shifting phase so that the DCS reception side viewed from a junction point between the transmission line DSL2 and the cathode of the diode D3 is open to the frequencies of the PCS/DCS transmission signals. Also, the diode D3 is opened and the PCS/DCS transmission side is opened. More precisely, since the diode D3 functions as a capacitance element having a small capacitance in its OFF state, parallel resonance of the capacitance of the diode D3 and the inductance element DPSLt increases the impedance to the frequencies of the PCS/DCS transmission signals, so that the PCS/DCS transmission side is opened. Although the PCS reception signal passes through the transmission line DSL2, it is blocked by the SAW filter SAW3. Accordingly, the PCS reception signal is transmitted only to the PCS reception side.

When both of the control-voltage input terminals Vc2 and Vc3 are in a Low level, the diodes D3 to D5 are OFF, and thus the diodes D3 and D4 are open and the PCS/DCS transmission side and the PCS reception side are open to the DCS reception signal. Accordingly, the DCS reception signal is transmitted only to the DCS reception port through the transmission line DSL2.

Figure 10:
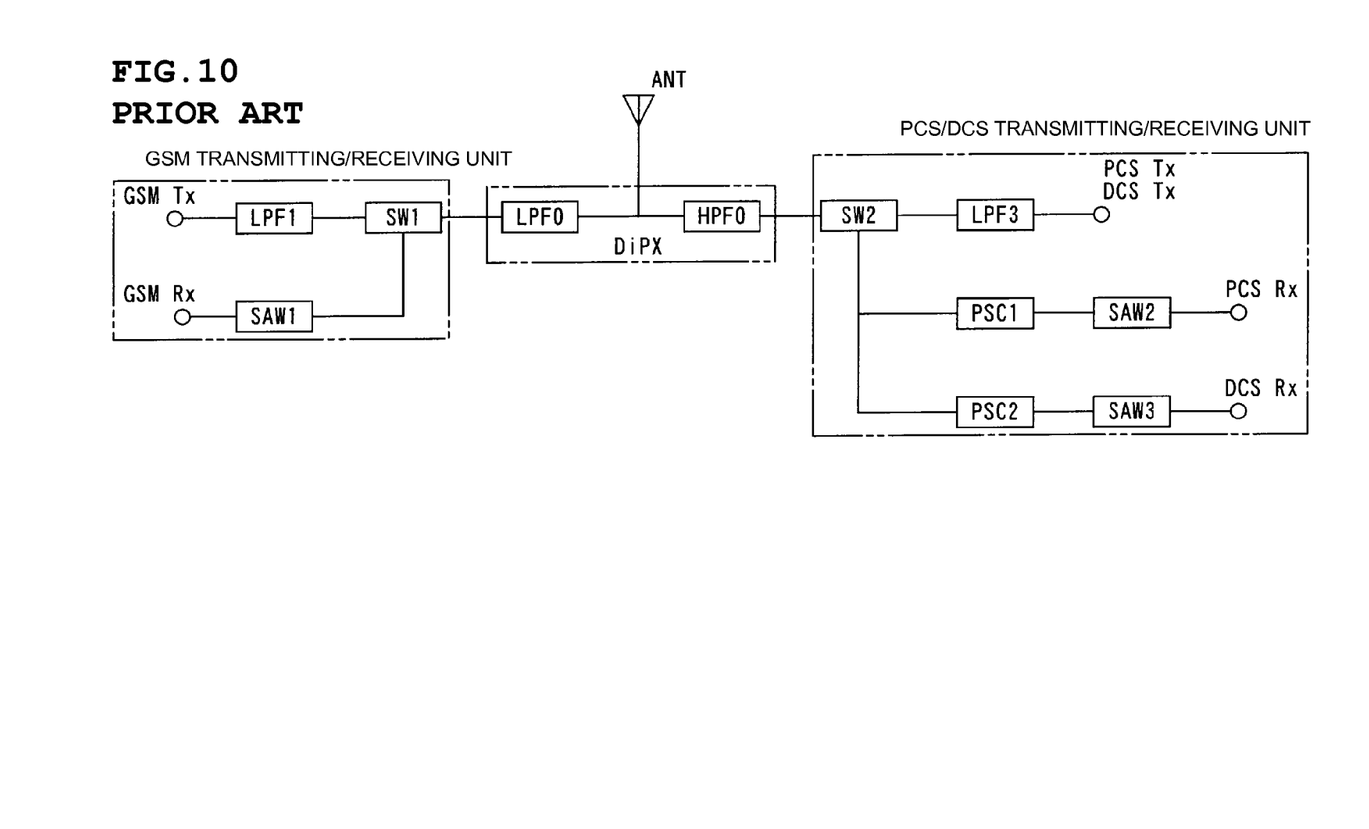
FIG. 10 is a block diagram showing a critical portion of another known high-frequency module.
Figure 11:
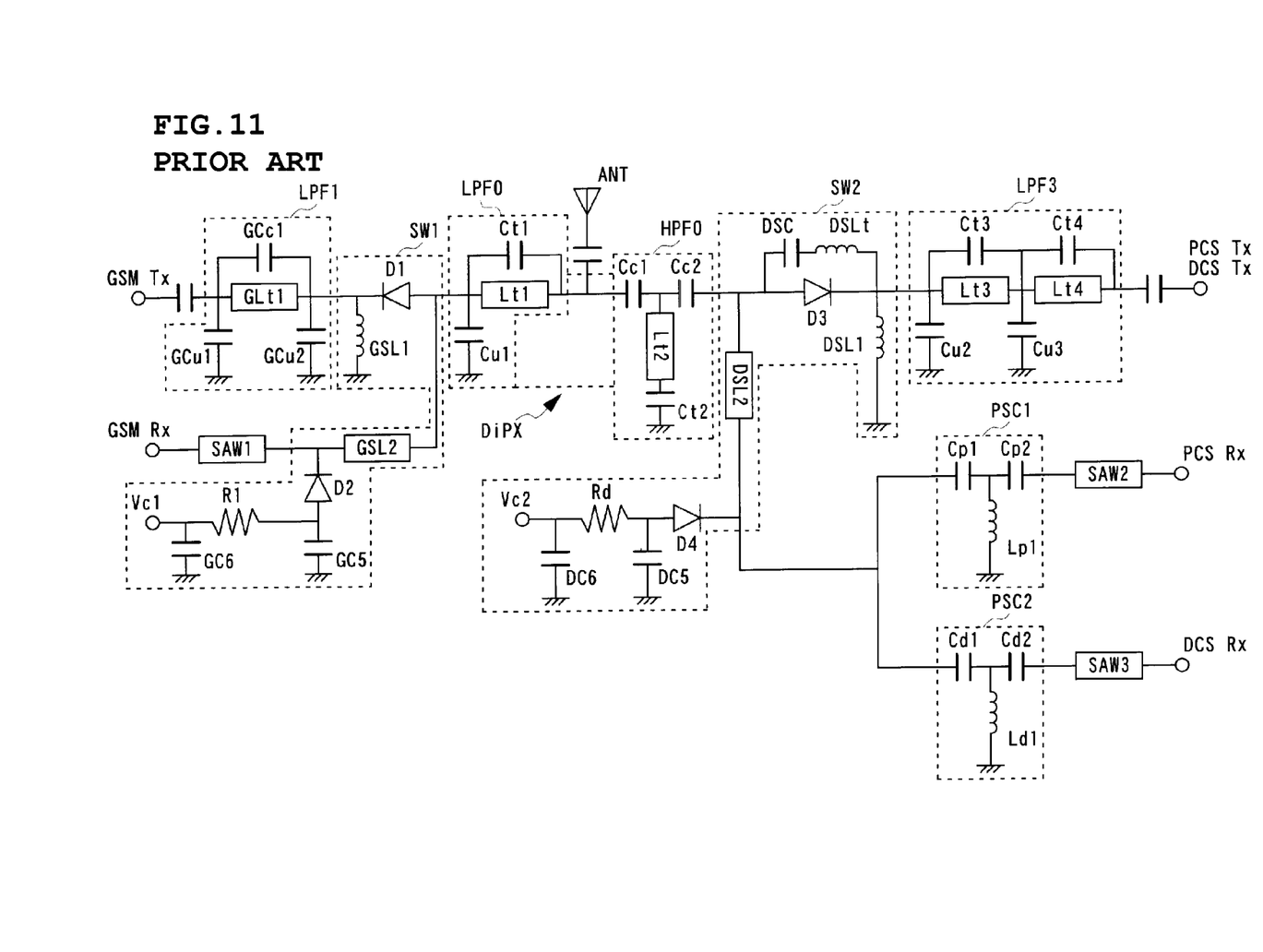
FIG. 11 is an equivalent circuit diagram of the high-frequency module shown in FIG. 10.

As another example of a high-frequency module for controlling transmission/reception signals by operating voltage input to control-voltage input terminals of switching circuits, a high-frequency module shown in FIGS. 10 and 11 has been proposed.

FIG. 10 is a block diagram of another known high-frequency module and FIG. 11 is the equivalent circuit diagram thereof. The configuration of a GSM transmitting/receiving unit of the high-frequency module shown in FIGS. 10 and 11 is the same as that of the high-frequency module show in FIGS. 8 and 9.

In the high-frequency module shown in FIGS. 10 and 11, the PCS/DCS transmission/reception side of the diplexer DiPX is provided with a high-pass filter HPF0, and a switching circuit SW2 is connected to the PCS/DCS side of the diplexer DiPX. The switching circuit SW2 is connected to a PCS/DCS Tx terminal through a low-pass filter LPF3. Also, the switching circuit SW2 is connected to SAW filters SAW2 and SAW3 through phase-shift circuits PSC1 and PSC2, respectively, and the SAW filters SAW2 and SAW3 are connected to a PCS Rx terminal and a DCS Rx terminal, respectively.

The switching circuit SW2 includes a diode D3, the anode thereof being connected to the high-pass filter HPF0 of the diplexer DiPX and the cathode thereof being connected to the low-pass filter LPF3, a series circuit including an inductance element DSLt and a capacitance element DSC connected in parallel with the diode 3, an inductance element DSL1 connected between the cathode of the diode D3 and the ground, a transmission line DSL2 connected between the anode of the diode D3 and the phase-shift circuits PSC1 and PSC2, a diode D4, the cathode thereof being connected to a junction point between the transmission line DSL2 and the phase-shift circuits PSC1 and PSC2, a control-voltage input terminal Vc2 connected to the anode of the diode D4 through a resistor Rd, and capacitance elements DC5 and DC6 connected between both ends of the resistor Rd and the ground.

In this high-frequency module, transmission/reception state is controlled by operating voltage input to the control-voltage input terminals, as shown in Table 2. The GSM side is the same as in FIG. 9, and thus the corresponding description will be omitted.

TABLE 2

| Vc1 | | Vc2 | |
|---|---|---|---|
| Hi | GSM Tx | Hi | PCS,DCS Tx |
| Low | GSM Rx | Low | PCS,DCS Rx |

When the control-voltage input terminal Vc2 is in a Hi level, the diodes D3 and D4 are ON, and the transmission line DSL2 functions as a phase-shift circuit for shifting phase so that the PCS/DCS reception port sides viewed from a junction point between the transmission line DSL2 and the anode of the diode D3 are open to frequencies of the PCS/DCS transmission signals. Accordingly, the PCS/DCS transmission signals are not transmitted to the PCS/DCS reception sides, but are transmitted only to the diplexer DiPX. On the other hand, when the control-voltage input terminal Vc2 is in a Low level, the diodes D3 and D4 are OFF and the diode D3 is opened, so that the PCS/DCS transmission terminal side is opened. More precisely, since the diode D3 functions as a capacitance element having a small capacitance, parallel resonance of the capacitance of the diode D3 and the inductance element DSLt increases the impedance to the frequencies of the PCS/DCS transmission signals and the DCS reception signal, so that the PCS/DCS transmission side is opened. Although the PCS reception signal passes through the switching circuit SW2, it is blocked by the low-pass filter LPF3. Accordingly, the PCS/DCS reception signals are transmitted only to the PCS/DCS reception terminal sides through the transmission line DSL2. The transmitted PCS/DCS reception signals are matched by the phase-shift circuits PSC1 and PSC2, respectively. Then, the PCS reception signal is output to the PCS Rx terminal through the SAW filter SAW2 and the DCS reception signal is output to the DCS Rx terminal through the SAW filter SAW3.

In this way, apparatuses for transmitting/receiving a plurality of communication signals of different frequency bands have been proposed (for example, see Patent Document 1: Japanese Unexamined Patent Application Publication No. 10-32521 and Patent Document 2: Japanese Unexamined Patent Application Publication No. 2001-160766).

However, the above-described high-frequency modules for transmitting/receiving GSM/PCS/DCS signals have the following problems to be solved.

In the high-frequency modules shown in FIGS. 8 and 10, sufficient isolation of the phase-shift circuit in the DCS Rx terminal side cannot be obtained when the PCS signal is transmitted, and the PCS transmission signal flows to the DCS Rx terminal. However, the frequency band of the PCS transmission signal partially overlaps the frequency band of the DCS reception signal. Thus, the SAW filter SAW3 connected to the DCS Rx terminal allows the PCS transmission signal to pass therethrough, so that the SAW filter SAW3 and an LNA connected in the subsequent stage of the DCS Rx terminal may be broken. Actually, isolation in the DCS Rx side when the PCS signal is transmitted needs to be at least about 32 dBm. However, the above-described known circuits can attenuate only 25 dBm. Also, in the circuit shown in FIG. 8, the control-voltage input terminal must be changed to a Hi level when receiving the PCS signal, and thus current consumption is generated while waiting for the PCS signal.

SUMMARY OF THE INVENTION

In order to overcome the problems described above, preferred embodiments of the present invention provide a high-frequency module for suppressing power consumption even when receiving PCS/DCS signals and preventing a PCS transmission signal from flowing to a DCS Rx terminal when the PCS signal is transmitted, and a communication apparatus including such a novel high-frequency module.

A high-frequency module according to a preferred embodiment of the present invention includes a separating unit for separating three (GSM, PCS, and DCS) communication signals having different transmission/reception frequency bands into a transmission/reception signal of each communication signal, a frequency selecting unit for selecting a frequency band of the transmission/reception signal so as to be passed therethrough, and a transmission port and a reception port for each of the communication signals. A reception signal side of each communication signal in the frequency selecting unit includes a SAW filter having a transmission characteristic according to each usable frequency band. The separating unit includes a diplexer for separating the three communication signals (GSM, PCS, and DCS) into a first communication signal (GSM) and second and third communication signals (PCS and DCS), a first switch for separating the first communication signal (GSM) into transmission and reception signals, a second switch for separating the second and third communication signals (PCS and DCS) into transmission signals and reception signals, and a duplexer for separating the reception signals into a reception signal of the second communication signal (PCS) and a reception signal of the third communication signal (DCS). The duplexer includes a first phase-shift circuit which includes at least a diode and which attenuates the transmission signal of the second communication signal (PCS) when the diode is ON and allows only the reception signal of the third communication signal (DCS) to pass therethrough when the diode is OFF.

The second switch includes a second phase-shift circuit which includes at least a diode and which attenuates the transmission signal of the second communication signal when the diode is ON and allows the reception signals of the second and third communication signals to pass therethrough when the diode is OFF.

With this configuration, each communication signal can be received when each diode is OFF. Further, by turning ON the diode when the second communication signal (PCS) is transmitted, isolation of the phase-shift circuit in the reception side of the third communication signal (DCS), that is, in the DCS Rx terminal side, can be improved. Therefore, the PCS transmission signal can be prevented from being transmitted to the DCS Rx terminal side. Accordingly, breakdown of circuit elements, such as a SAW filter in the DCS Rx terminal side and an LNA connected to the DCS Rx terminal, which is caused when the PCS transmission signal is input, can be prevented.

In the high-frequency module of a preferred embodiment of the present invention, a control-voltage input terminal to the diode of the second switch is also used as a control-voltage input terminal to the diode of the duplexer.

With this configuration, the circuit structure can be simplified by integrating the control-voltage input terminals, and thus the high-frequency module can be miniaturized.

Also, each of the first and second phase-shift circuits includes one of a strip line and a microstrip line.

With this configuration, a portion of each phase-shift circuit can be defined by a transmission line disposed on a substrate. Therefore, the circuit structure can be simplified and the high-frequency module can be miniaturized.

Further, each of the first and second phase-shift circuits preferably includes a chip-shaped inductance element.

With this configuration, phase shift which cannot be matched by the strip line or the microstrip line can be matched by using the chip-shaped inductance element. Accordingly, matching can be performed in a wide frequency band.

Also, each of the separating unit and the transmission/reception ports includes an electrode pattern disposed on the surface of each layer of a multilayer dielectric substrate or an element mounted on the electrode pattern.

With this configuration, the high-frequency module can be formed by using a multilayer substrate circuit, so that the integrated and miniaturized high-frequency module can be obtained.

A communication apparatus according to another preferred embodiment of the present invention includes the high-frequency module according to preferred embodiments described above as a front-end.

Accordingly, by using the high-frequency module according to preferred embodiments described above as a front-end, the three types of communication signals (GSM, PCS, and DCS) can be transmitted/received with low loss, and thus a communication apparatus having an excellent communication characteristic can be obtained.

Other features, elements, characteristics, and advantages of the present invention will become apparent from the following detailed description of preferred embodiments thereof with reference to the attached drawings.

DETAILED DESCRIPTION OF PREFERRED EMBODIMENTS

Hereinafter, the configuration of a high-frequency module according to preferred embodiments of the present invention will be described with reference to the drawings.

Figure 1:
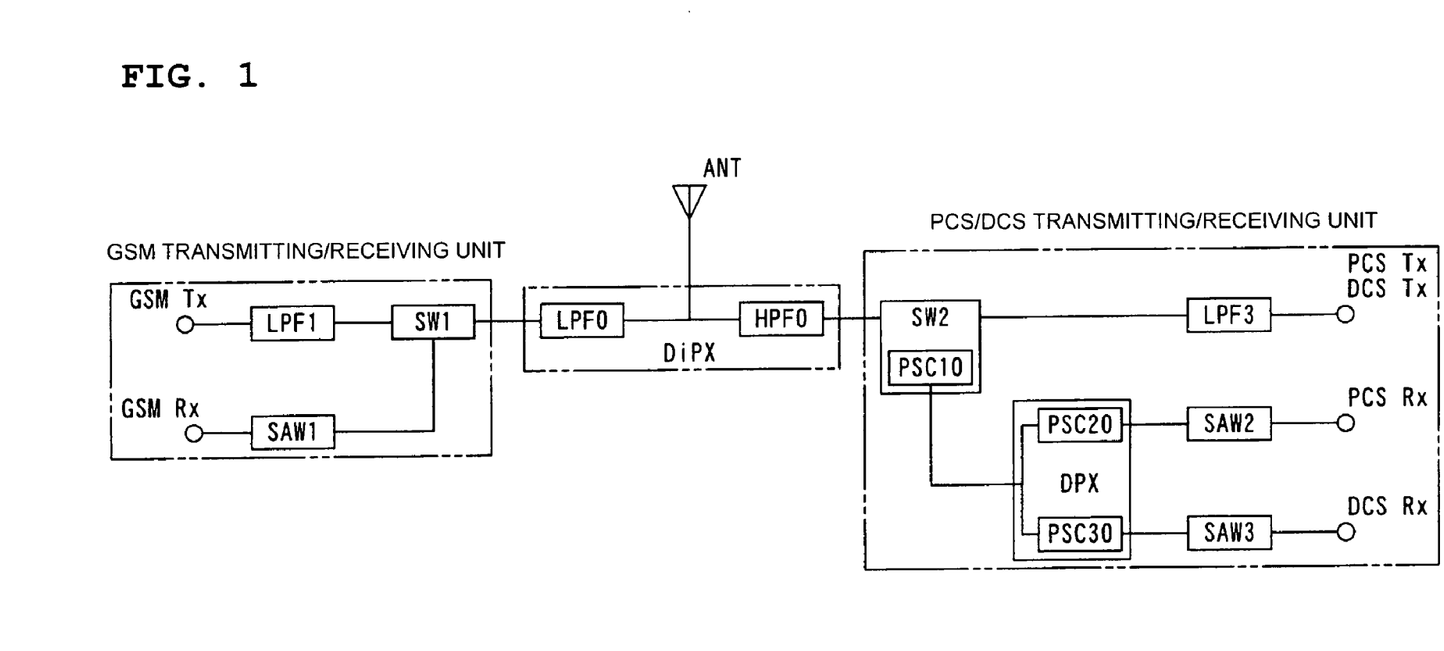
FIG. 1 is a block diagram showing a critical portion of a high-frequency module according to a preferred embodiment of the present invention.
Figure 2:
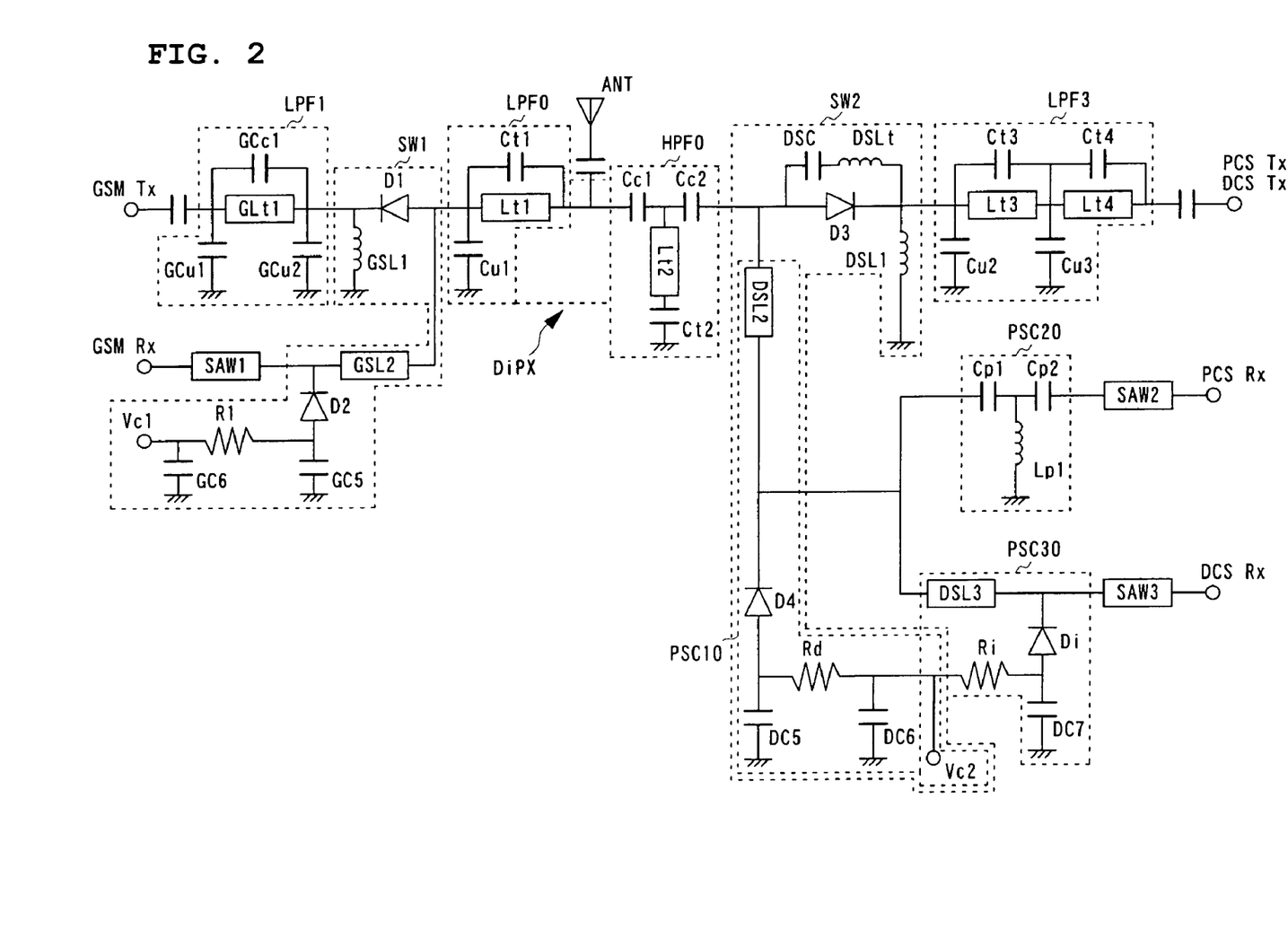
FIG. 2 is an equivalent circuit diagram of the high-frequency module.

FIG. 1 is a block diagram showing a critical portion of a high-frequency module according to a preferred embodiment of the present invention; and FIG. 2 shows the equivalent circuit of the high-frequency module.

As shown in FIG. 1, the high-frequency module for transmitting/receiving communication signals of GSM, DCS, and PCS includes a GSM transmitting/receiving unit; a PCS/DCS transmitting/receiving unit; and a diplexer DiPX.

The GSM transmitting/receiving unit includes a GSM Tx terminal to which a GSM transmission signal is input, a GSM Rx terminal for outputting a GSM reception signal, a low-pass filter LPF1 for allowing the GSM transmission signal to pass therethrough, a SAW filter SAW1 for allowing the GSM reception signal to pass therethrough, and a switching circuit SW1 for switching the GSM transmission signal and the GSM reception signal. The switching circuit SW1 corresponds to a first switch of preferred embodiments of the present invention.

The PCS/DCS transmitting/receiving unit includes a PCS/DCS Tx terminal to which PCS/DCS transmission signals are input, a PCS Rx terminal for outputting a PCS reception signal, a DCS Rx terminal for outputting a DCS reception signal, a low-pass filter LPF3 for allowing the PCS/DCS transmission signals to pass therethrough, a SAW filter SAW2 for allowing the PCS reception signal to pass therethrough, a SAW filter SAW3 for allowing the DCS reception signal to pass therethrough, a switching circuit SW2 for switching the PCS/DCS transmission signals and the PCS/DCS reception signals, the switching circuit SW2 corresponding to a second switch of preferred embodiments of the present invention, and a duplexer DPX for separating the PCS/DCS reception signals.

The switching circuit SW2 includes a phase-shift circuit PSC10 which matches the PCS/DCS reception signals and which has a switching function. The duplexer DPX includes a phase-shift circuit PSC20 for matching only the PCS reception signal and a phase-shift circuit PSC30 for matching only the DCS reception signal and having a switching function.

The diplexer DiPX includes a low-pass filter LPF0 for allowing the GSM transmission/reception signals to pass therethrough and a high-pas filter HPF0 for allowing the PCS/DCS transmission/reception signals to pass therethrough. Further, an antenna ANT is connected to a junction point between the low-pass filter LPF0 and the high-pass filter HPF0.

More specifically, as shown in FIG. 2, the switching circuit SW1 includes a diode D1, the cathode thereof being connected to the low-pass filter LPF1 and the anode thereof being connected to the low-pass filter LPF0 of the diplexer DiPX, an inductance element GSL1 connected between the cathode of the diode D1 and the ground, a transmission line GSL2 connected between the anode of the diode D1 and the SAW filter SAW1, a diode D2, the cathode thereof being connected to a junction point between the transmission line GSL2 and the SAW filter SAW1, a control-voltage input terminal Vc1 connected to the anode of the diode D2 through a resistor R1, and capacitance elements GC5 and GC6 connected between both ends of the resistor R1 and the ground, respectively.

The switching circuit SW2 includes a diode D3, the cathode thereof being connected to the low-pass filter LPF3 and the anode thereof being connected to the high-pass filter HPF0 of the diplexer DiPX, a series circuit including an inductance element DSLt and a capacitance element DSC connected in parallel with the diode D3, an inductance element DSL1 connected between the cathode of the diode D3 and the ground, a diode D4, the cathode thereof being connected to the anode of the diode D3 through a transmission line DSL2, a control-voltage input terminal Vc2 connected to the anode of the diode D4 through a resistor Rd, and capacitance elements DC5 and DC6 connected between both ends of the resistor Rd and the ground, respectively. Herein, the transmission line DSL2, the diode D4, and the capacitance element DC5 function as the phase-shift circuit PSC10 which is switched in accordance with ON/OFF of the control-voltage input terminal Vc2.

The phase-shift circuit PSC20 of the duplexer DPX includes two capacitance elements Cp1 and Cp2 connected in series, and an inductance element Lp1 connected between a junction point between the capacitance elements Cp1 and Cp2 and the ground. The capacitance element Cp1 is connected to a junction point between the transmission line DSL2 and the diode D4 of the switching circuit SW2 and the capacitance element Cp2 is connected to the SAW filter SAW2.

The phase-shift circuit PSC30 of the duplexer DPX includes a transmission line DSL3 connected between the junction point between the transmission line DSL2 and the diode D4 and the SAW filter SAW3, a diode D1, the cathode thereof being connected to a junction point between the SAW filter SAW3 and the transmission line DSL3, a resistor Ri connected between the anode of the diode D1 and the control-voltage input terminal Vc2, and a capacitance element DC7 connected between the anode of the diode D1 and the ground.

In this high-frequency module, a transmission/reception state of each communication signal is controlled by controlling voltage input to the control-voltage input terminals Vc1 and Vc2, as shown in Table 3.

TABLE 3

| Vc1 | | Vc2 | |
|---|---|---|---|
| Hi | GSM Tx | Hi | PCS,DCS Tx |
| Low | GSM Rx | Low | PCS,DCS Rx |

First, transmission/reception of the GSM communication signal will be described.

As shown in Table 3, when the control-voltage input terminal Vc1 is in a Hi level, the diodes D1 and D2 are ON, and the transmission line GSL2 functions as a phase-shift circuit for shifting phase so that the GSM reception side viewed from a junction point between the transmission line GSL2 and the anode of the diode D1 is open to the frequency of the GSM transmission signal. Accordingly, the switching circuit SW1 transmits the GSM transmission signal to the diplexer DiPX, while preventing the GSM transmission signal from being transmitted to the GSM reception side (GSM Rx terminal). On the other hand, when the control-voltage input terminal Vc1 is in a Low level, the diodes D1 and D2 are OFF and are open. Therefore, the GSM reception signal from the diplexer DiPX is not transmitted to the GSM transmission side but is transmitted to the GSM Rx terminal through the transmission line GSL2 and the SAW filter SAW1.

Next, transmission/reception of the PCS/DCS communication signals will be described.

As shown in Table 3, when the control-voltage input terminal Vc2 is in a Hi level, the diodes D3, D4, and Di are ON, and the transmission line DSL2 of the phase-shift circuit PSC10 of the switching circuit SW2 functions as a phase-shift circuit for shifting phase so that the PCS/DCS reception side viewed from a junction point between the transmission line DSL2 and the anode of the diode D3 is open to the frequencies of the PCS/DCS transmission signals. Accordingly, the transmission line DSL2 functions as an isolation circuit for obtaining predetermined isolation. Also, the transmission line DSL3 of the phase-shift circuit PSC30 functions as a phase-shift circuit for shifting phase so that the DCS reception side viewed from a junction point between the transmission line DSL3 and the cathode of the diode D4 is open to the frequency of the PCS transmission signal. Accordingly, the transmission line DSL3 functions as an isolation circuit for obtaining predetermined isolation. Therefore, the PCS/DCS transmission signals are attenuated by a predetermined amount by the phase-shift circuit PSC10 of the switching circuit SW2. The PCS/DCS transmission signals attenuated by the phase-shift circuit PSC10 are transmitted to the phase-shift circuit PSC20 of the duplexer DPX. However, the phase-shift circuit PSC 20 matches only signals of the frequency band of the PCS reception signal and the SAW filter SAW2 blocks signals not having the frequency band of the PCS reception signal. Therefore, the PCS/DCS transmission signals are not transmitted to the PCS Rx terminal. Also, among the attenuated PCS/DCS transmission signals, the PCS transmission signal is further attenuated by the phase-shift circuit PSC30 of the duplexer DPX, and the DCS transmission signal is blocked by the SAW filter SAW3. Therefore, the PCS/DCS transmission signals are not transmitted to the DCS Rx terminal.

In this way, by attenuating the PCS transmission signal by a predetermined amount by each of the two stages of phase-shift circuits PSC 10 and PSC30, a required amount of attenuation for the PCS transmission signal can be obtained as a phase-shift circuit connected in series to these two stages. Therefore, the PCS transmission signal is not transmitted to the SAW filter SAW3 and the DCS Rx terminal. Accordingly, the PCS/DCS transmission signals from the PCS/DCS Tx terminal are transmitted to the diplexer DiPX.

Figure 3A:
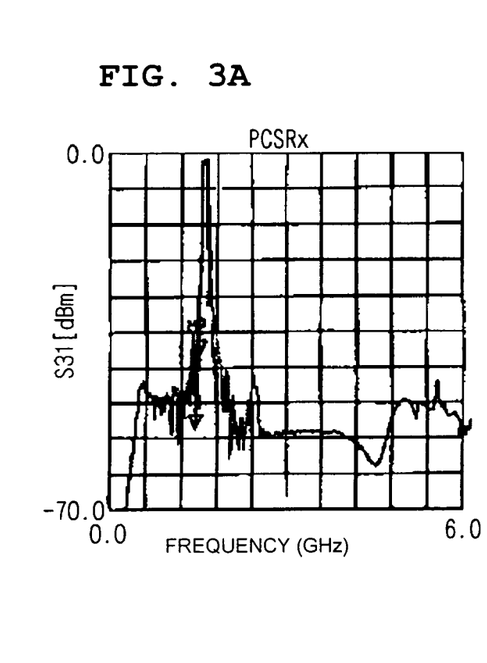
FIGS. 3A and 3B show attenuation characteristics of signals transmitted to a PCS Rx terminal and a DCS Rx terminal, respectively, when a control-voltage input terminal Vc2 is in a Hi level, that is, when each diode is ON, and FIG. 3C is a Smith chart showing the impedance in a phase-shift circuit in the DCS Rx side.
Figure 3B:
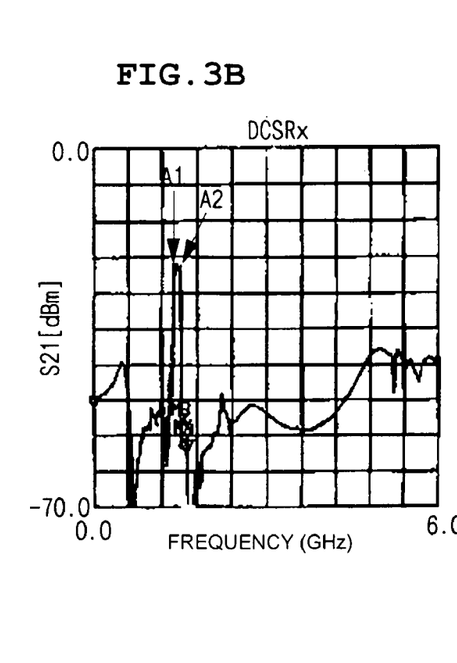
Figure 3C:
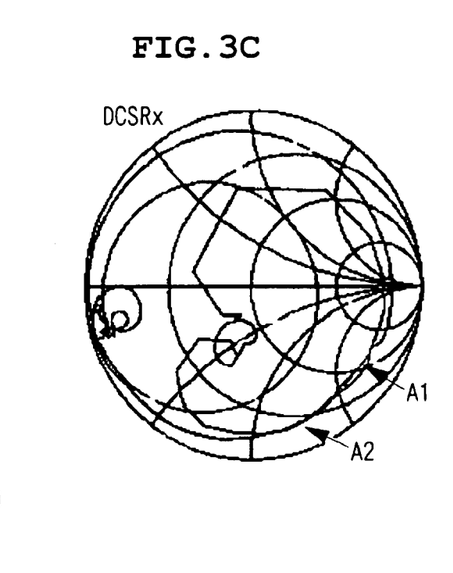

A simulation result of the transmission characteristics of the PCS Rx-side circuit and the DCS Rx-side circuit in this case is shown in FIGS. 3A to 3C.

FIGS. 3A to 3C show a case where the control-voltage input terminal Vc2 is in a Hi level, that is, the diodes D3, D4, and Di are ON. FIG. 3A shows the attenuation characteristic of the PCS Rx-side circuit, that is, a series circuit including the phase-shift circuits PSC10 and PSC20; FIG. 3B shows the attenuation characteristic of the DCS Rx-side circuit, that is, a series circuit including the phase-shift circuits PSC10 and PSC30; and FIG. 3C is a Smith chart showing the characteristic impedance of the DCS Rx-side circuit. Frequency points A1 and A2 on the characteristic curve shown in FIG. 3B correspond to points A1 and A2 on the impedance curve in the Smith chart shown in FIG. 3C.

As shown in FIGS. 3A to 3C, when the control-voltage input terminal Vc2 is in a Hi level (when the PCS/DCS signals are transmitted), the PCS/DCS transmission signals are attenuated by the phase-shift circuits PSC10 and PSC20, so that the PCS/DCS transmission signals are not transmitted to the SAW filter SAW2.

Also, since a signal of the frequency band of the PCS transmission signal is attenuated by about 32 dBm or more by the phase-shift circuits PSC10 and PSC30, the PCS transmission signal is hardly transmitted to the SAW filter SAW3, which allows the DCS reception signal having a frequency band partly common with the frequency band of the PCS transmission signal to pass therethrough. Accordingly, breakdown of the SAW filter in the DCS Rx side can be prevented when the PCS signal is transmitted.

On the other hand, as shown in Table 3, when the control-voltage input terminal Vc2 is in a Low level, the diodes D3, D4, and Di are OFF and the diode D3 is open, so that the PCS/DCS Tx terminal side is open. More precisely, since the diode D3 functions as a capacitance element having a small capacitance, parallel resonance of the capacitance of the diode D3 and the inductance element DSLt increases the impedance to the frequencies of the PCS/DCS transmission signals and the DCS reception signal. Accordingly, the PCS/DCS Tx terminal side is opened. The PCS reception signal passes through the switching circuit SW2, but is blocked by the low-pass filter LPF3.

Accordingly, the PCS/DCS reception signals from the diplexer DiPX are not transmitted to the PCS/DCS transmission side. Also, the PCS reception signal is transmitted to the PCS Rx terminal through the transmission line DSL2, the phase-shift circuit PSC20, and the SAW filter SAW2. The DCS reception signal is transmitted to the DCS Rx terminal through the transmission lines DSL2 and DSL3 and the SAW filter SAW3.

Figure 4A:
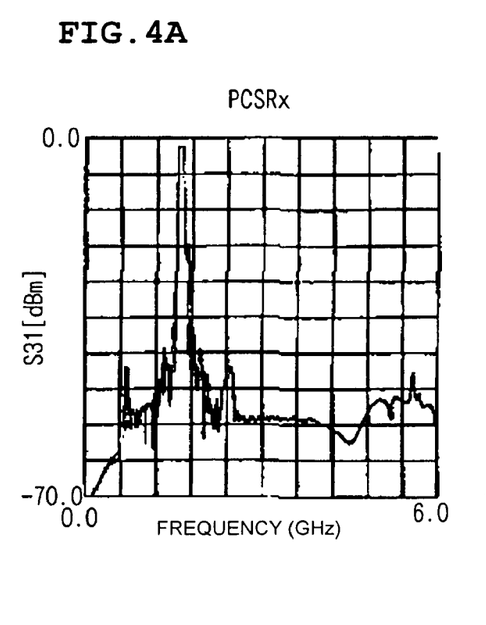
FIGS. 4A and 4B show attenuation characteristics of signals transmitted to the PCS Rx terminal and the DCS Rx terminal, respectively, when the control-voltage input terminal Vc2 is in a Low level, that is, when each diode is OFF.
Figure 4B:
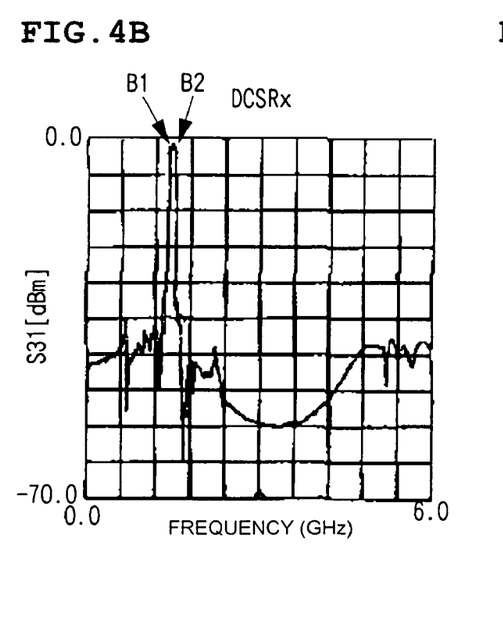
Figure 4C:
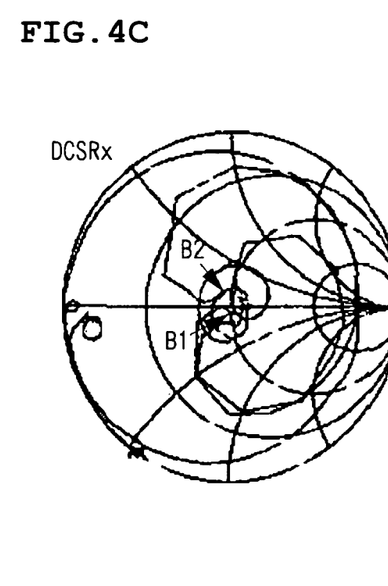
FIG. 4C is a Smith chart showing the impedance in the phase-shift circuit in the DCS Rx side.

A simulation result of the transmission characteristics of the PCS Rx-side circuit and the DCS Rx-side circuit in this case is shown in FIGS. 4A to 4C.

FIGS. 4A to 4C show a case where the control-voltage input terminal Vc2 is in a Low level, that is, the diodes D3, D4, and Di are OFF. FIG. 4A shows the attenuation characteristic of the PCS Rx-side circuit, that is, a series circuit including the phase-shift circuits PSC10 and PSC20; FIG. 4B shows the attenuation characteristic of the DCS Rx-side circuit, that is, a series circuit including the phase-shift circuits PSC10 and PSC30; and FIG. 4C is a Smith chart showing the characteristic impedance of the DCS Rx-side circuit. Frequency points B1 and B2 on the characteristic curve shown in FIG. 4B correspond to points B1 and B2 on the impedance curve in the Smith chart shown in FIG. 4C.

As shown in FIGS. 4A to 4C, when the control-voltage input terminal Vc2 is in a Low level, only the PCS reception signal is transmitted to the SAW filter SAW2 by the phase-shift circuit PSC20, and only the DCS reception signal is transmitted to the SAW filter SAW3 when the phase-shift circuit PSC30 performs impedance matching in the frequency band of the DCS reception signal. With this configuration, when the control-voltage input terminal Vc2 is in a Low level, the PCS/DCS reception signals are not transmitted to the PCS/DCS transmission side, but can be transmitted to the PCS Rx terminal and the DCS Rx terminal with low loss.

Further, in the above-described apparatus, the control-voltage input terminal may be in a Low level (power is not supplied) while receiving any communication signal, and thus current consumption can be suppressed.

In the above-described preferred embodiment, the circuit is preferably configured so that the diodes are ON when the control voltage is in a Hi level. Alternatively, the circuit may be configured so that the diodes are ON when the control voltage is in a Low level, by providing the diodes in the opposite direction.

Next, the configuration of the high-frequency module including a multilayer substrate and having the above-described function will be described with reference to FIGS. 5 and 6.

Figure 5:
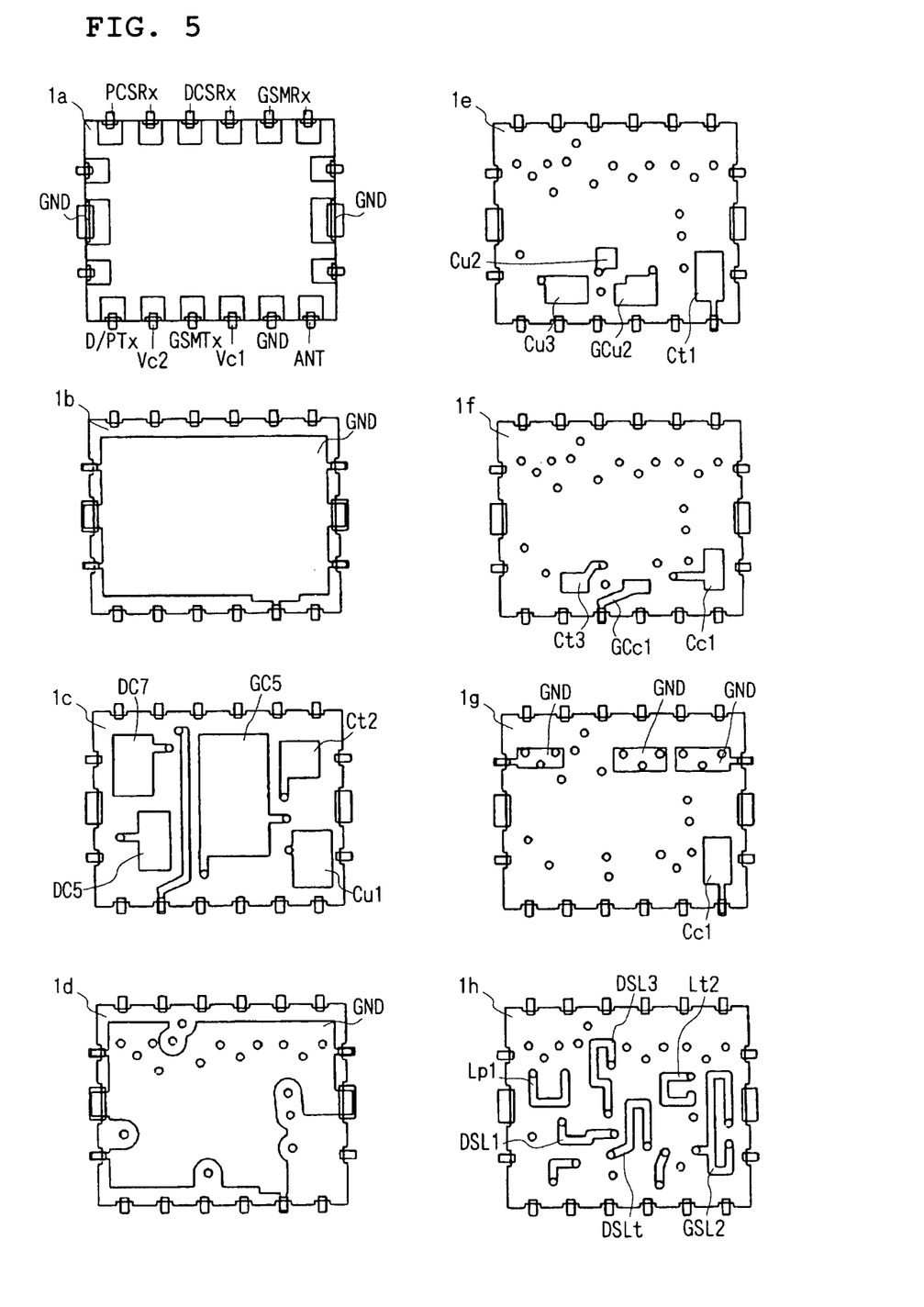
FIG. 5 is an exploded plan view showing a specific example of the high-frequency module including a multilayer substrate.
Figure 6:
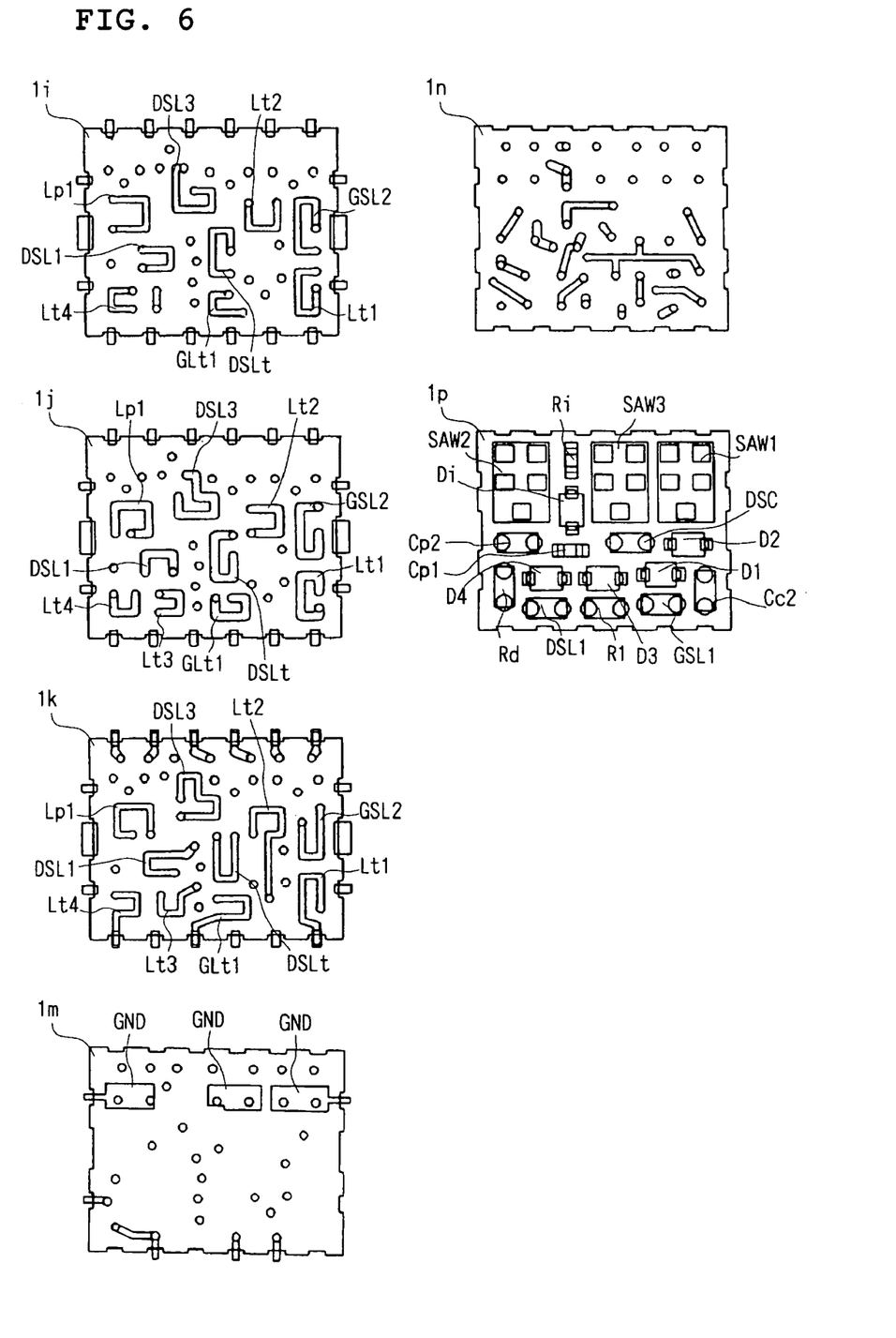
FIG. 6 is an exploded plan view showing the specific example of the high-frequency module including the multilayer substrate.

FIGS. 5 and 6 are exploded plan views showing a specific example of the high-frequency module including a multilayer substrate. FIGS. 5 and 6 show each of laminated dielectric layers $1a$ to $1k$, $1m$, $1n$, and $1p$ of the substrate in order, in which the dielectric layer $1a$ in FIG. 5 is the bottom layer and the dielectric layer $1p$ in FIG. 6 is the top layer. Herein, FIGS. 5 and 6 show the dielectric layers $1a$ to $1k$, $1m$, $1n$, and $1p$ viewed from the lower side (side directed to mounted substrate). Reference numerals (symbols) shown in FIGS. 5 and 6 correspond to those of the elements shown in FIG. 2.

Various external terminals, used for mounting the multilayer substrate on the mounted substrate, are provided in the bottom dielectric layer $1a$. Herein, D/P Tx is an input terminal for the DCS/PCS transmission signals and GSM Tx is an input terminal for the GSM transmission signal. GSM Rx is an output terminal for the GSM reception signal, DCS Rx is an output terminal for the DCS reception signal, and PCS Rx is an output terminal for the PCS reception signal. ANT is an antenna terminal, Vc1 and Vc2 are control-voltage input terminals, and GND is a ground terminal.

The dielectric layer $1b$ is provided with a common ground electrode GND, and the dielectric layer $1c$ is provided with opposed electrodes of capacitance elements GC5, DC7, DC5, Ct2, and Cu1.

The dielectric layer $1d$ is provided with a common ground electrode GND, and the dielectric layer $1e$ is provided with opposed electrodes of capacitance elements Cu2, Cu3, GCu2, and Ct1.

The dielectric layer $1f$ is provided with opposed electrodes of capacitance elements Ct3, GCc1, and Cc1, and the dielectric layer $1g$ is provided with intermediate ground electrodes GND for the SAW filters SAW1 to SAW3 and an opposed electrode of the capacitance element Cc1.

The dielectric layer $1h$ is provided with electrodes for the inductance elements Lp1, DSL1, DSL3, DSLt, Lt2, and GSL2.

Each of the dielectric layers $1i$, $1j$, and $1k$ is provided with electrodes for the inductance elements Lp1, DSL1, DSL3, DSLt, GSL2, GLt1, Lt1, Lt2, Lt3, and Lt4.

The dielectric layer $1m$ is provided with intermediate ground electrodes for the SAW filters SAW1 to SAW3, and the dielectric layer $1n$ is provided with electrodes for the transmission lines.

The top dielectric layer $1p$ is provided with electrodes used for mounting various components thereon. The SAW filters SAW1 to SAW3, the diodes D1 to D4 and Di, the resistors Ri, Rd, and R1, the inductance elements DSL1 and GSL1, the capacitance elements DSC, Cp1, Cp2, and Cc2 are mounted at predetermined positions of these electrodes.

As described above, by using the multilayer substrate, the above-described high-frequency module can be miniaturized as a single component.

In this preferred embodiment, the inductance elements DSL1 and GSL1 are preferably used as mounted chip inductors (chip coils) and the capacitance elements DSC, Cp1, Cp2, and Cc2 are used as mounted capacitance elements (chip capacitors). Also, the other inductance elements and capacitance elements are preferably configured by electrodes (intermediate electrodes) disposed on intermediate layers of the multilayer substrate. However, each element constituting the phase-shift circuits may be any of a chip element and an intermediate electrode element in accordance with a required characteristic.

Next, a communication apparatus including the above-described high-frequency module will be described with reference to FIG. 7.

Figure 7:
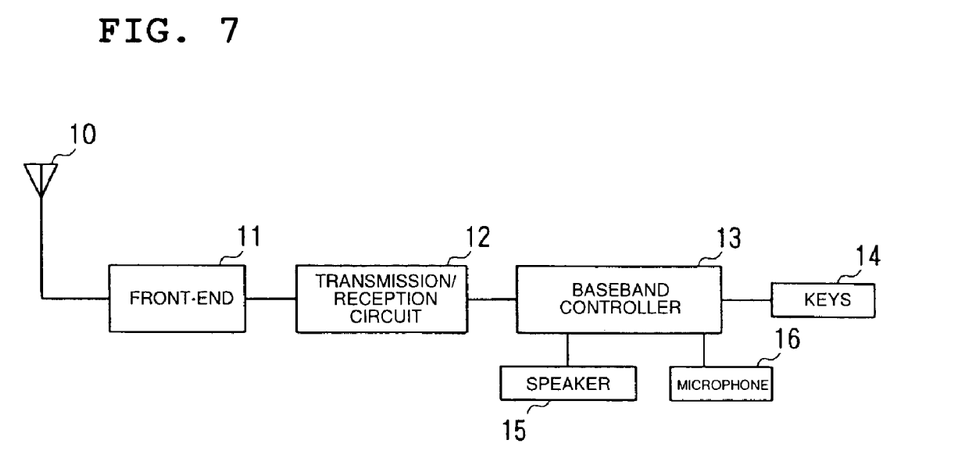
FIG. 7 is a block diagram showing a critical portion of a communication apparatus.

FIG. 7 is a block diagram showing a critical portion of the communication apparatus according to another preferred embodiment of the present invention.

As shown in FIG. 7, the communication apparatus preferably includes an antenna 10 for transmitting/receiving GSM/PCS/DCS communication signals, a front-end 11 for separating the three types of communication signals, a transmission/reception circuit 12 for generating a transmission signal and demodulating a reception signal, keys 14 defining a user interface, a speaker 15, a microphone 16, and baseband controller 13 for controlling signals between the transmission/reception circuit 12 and the user interface. The high-frequency module according to preferred embodiments described above is used for the front-end 11.

With this configuration, a separator for each of three types of communication signals using different frequency bands need not be provided, and thus a compact communication apparatus can be obtained while realizing an excellent communication characteristic.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A high-frequency module comprising:
   a separating unit for separating at least three communication signals having different transmission/reception frequency bands into a transmission/reception signal of each of the at least three communication signals;
   a frequency selecting unit for selecting a frequency band of the transmission/reception signal so as to be passed therethrough; and
   a transmission port and a reception port for each of the at least three communication signals; wherein
   a reception signal side of each of the at least three communication signals in the frequency selecting unit includes a SAW filter having a transmission characteristic according to each usable frequency band;
   the separating unit includes a diplexer for separating the at least three communication signals into a first communication signal and second and third communication signals, a first switch for separating the first communication signal into transmission and reception signals, a second switch for separating the second and third communication signals into transmission signals and reception signals, and a duplexer for separating the reception signals into a reception signal of the second communication signal and a reception signal of the third communication signal; and
   the duplexer includes a first phase-shift circuit which includes at least a diode and which attenuates the transmission signal of the second communication signal when the diode is ON and allows only the reception signal of the third communication signal to pass therethrough when the diode is OFF.

2. A high-frequency module according to claim 1, wherein the second switch includes a second phase-shift circuit which includes at least a diode and which attenuates the transmission signal of the second communication signal when the diode is ON and allows the reception signals of the second and third communication signals to pass therethrough when the diode is OFF.

3. A high-frequency module according to claim 2, wherein a control-voltage-input to the diode of the second switch is also used as a control-voltage-input to the diode of the duplexer.

4. A high-frequency module according to claim 2, wherein the diodes of the first and second switches are arranged to be ON when a control voltage is in a Hi level.

5. A high-frequency module according to claim 2, wherein the diodes of the first and second switches are arranged to be ON when a control voltage is in a Low level.

6. A high-frequency module according to claim 1, wherein each of the first and second phase-shift circuits includes one of a strip line and a microstrip line.

7. A high-frequency module according to claim 1, wherein each of the first and second phase-shift circuits includes a chip-shaped inductance element.

8. A high-frequency module according to claim 1, wherein each of the separating unit, the frequency selecting unit, and the transmission/reception ports includes an electrode pattern disposed on the surface of each layer of a multilayer dielectric substrate or an element mounted on the electrode pattern.

9. A high-frequency module according to claim 1, wherein the at least three communication signals include GSM, DCS and PCS.

10. A high-frequency module according to claim 1, further comprising a GSM transmitting/receiving unit and a PCS/DCS transmitting/receiving unit.

11. A high-frequency module according to claim 1, wherein a transmission/reception state of each of the at least three communication signals is controlled by controlling voltage input to control-voltage input terminals.

12. A high-frequency module according to claim 1, wherein the diode is arranged to be ON when a control voltage is in a Hi level.

13. A high-frequency module according to claim 1, wherein the diode is arranged to be ON when a control voltage is in a Low level.

14. A high-frequency module according to claim 1, further comprising a multilayer substrate including a plurality of laminated dielectric layers, an input terminal for DCS/PCS transmission signals, an input terminal for GSM transmission signal, an output terminal for a GSM reception signal, an output terminal for a DCS reception signal, an output terminal for a PCS reception signal, an antenna terminal, control-voltage input terminals, and a ground terminal.

15. A high-frequency module according to claim 14, wherein the multilayer substrate includes capacitance elements, inductance elements and a common ground electrode.

16. A high-frequency module according to claim 14, wherein a top layer of the multilayer substrate includes electrodes for connection to at least one of a surface acoustic wave filter, a diode, a resistor, an inductance element, and a capacitance element.

17. A communication apparatus comprising the high-frequency module according to claim 1, wherein the high-frequency module defines a front-end of the communication apparatus.

18. A high-frequency module according to claim 1, wherein the diode of the first phase-shift circuit is provided at a node between a transmission line for the reception signal of the third communication signal and the SAW filter of the reception signal side of the third communication signal.

* * * * *